UNITED STATES PATENT OFFICE.

MYRTIL KAHN, OF ELBERFELD, GERMANY, ASSIGNOR TO FARBENFABRIKEN OF ELBERFELD CO., OF NEW YORK, N. Y., A CORPORATION OF NEW YORK.

WOOL-DYE AND PROCESS OF MAKING SAME.

SPECIFICATION forming part of Letters Patent No. 722,715, dated March 17, 1903.

Application filed October 16, 1902. Serial No. 127,602. (Specimens.)

*To all whom it may concern:*

Be it known that I, MYRTIL KAHN, doctor of philosophy, chemist, residing at Elberfeld, Germany, (assignor to the FARBENFABRIKEN OF ELBERFELD CO., of New York,) have invented a new and useful Improvement in Wool-Dye and Process of Making Same; and I do hereby declare the following to be an exact and clear description of my invention.

My invention relates to the production of a new and valuable azo dyestuff by combining the diazo derivative of ortho-amidophenol-para-sulfonic acid having the formula:

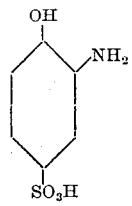

with 1:5-dioxynaphthalene.

In carrying out my process practically I can proceed as follows, the parts being by weight: Nineteen parts of ortho-amidophenol-para-sulfonic acid are diazotized in the usual manner, and the resulting diazo compound is stirred into a mixture of sixteen parts of 1:5-dioxynaphthalene with ice-water. Caustic-soda lye is added until the mixture is alkaline. The dioxynaphthalene enters into solution and the formation of the dyestuff begins. After being stirred for some time the excess of caustic-soda lye is neutralized by means of hydrochloric acid, and the new dyestuff is precipitated by the addition of common salt, filtered off, and dried. The new coloring-matter thus obtained is, when dry and pulverized, a dark-brown powder soluble in water to a violet solution, turning blue on the addition of a small quantity of caustic-soda lye, which color is changed to violet on adding a larger quantity of caustic-soda lye. It is soluble in concentrated sulfuric acid of 66° Baumé, with a violet-black color, turning violet by the addition of ice, a dark precipitate being obtained. It dyes wool from acid-bath violet-red shades. By subsequently treating the dyed fiber with chromium compounds reacting as oxidizing agents—such as chromates, bichromates, or the like—the shades are changed to deep black, distinguished for great fastness, to the "potting process," which is a finishing process for woolen piece goods. In this process the goods are entered into boiling water and allowed to remain there until the water is cold. The goods thus assume a high degree of gloss and softness, and, according to the effect desired, the "potting" may be repeated several times. They also resist milling and washing and possess a good fastness against the action of light.

Having now described my invention, what I claim is—

1. The herein-described process for the manufacture of a new azo dyestuff for wool, which consists in first combining the diazo compound of ortho-amidophenol-para-sulfonic acid having the above-given formula with 1:5-dioxynaphthalene and secondly isolating the monoazo dyestuff thus produced, substantially as hereinbefore described.

2. The herein-described new azo dyestuff derived from ortho-amidophenol-para-sulfonic acid and 1:5-dioxynaphthalene, which when in a dry state, is a dark-brown powder soluble in water with a violet color turning blue by the addition of a small quantity of caustic-soda lye which color is changed to violet by adding a larger quantity of caustic-soda lye; soluble in concentrated sulfuric acid of 66° Baumé with a violet-black color turning violet by the addition of ice, a dark precipitate being obtained; dyeing wool from acid-bath violet-red shades which are changed to deep black by a subsequent treatment with chromium compounds reacting as oxidizing agents, substantially as described.

In testimony whereof I have signed my name in the presence of two subscribing witnesses.

MYRTIL KAHN.

Witnesses:
OTTO KÖNIG,
J. A. RITTERSHAUS.